(12) United States Patent
Beaulieu et al.

(10) Patent No.: US 9,750,370 B2
(45) Date of Patent: Sep. 5, 2017

(54) CARTRIDGE WITH FILTER GUARD

(75) Inventors: Roderick H. Beaulieu, Cumberland, RI (US); James W. Wuertele, North Billerica, MA (US)

(73) Assignee: Keurig Green Mountain, Inc., Waterbury, VT (US)

( * ) Notice: Subject to any disclaimer, the term of this patent is extended or adjusted under 35 U.S.C. 154(b) by 515 days.

(21) Appl. No.: 12/474,420

(22) Filed: May 29, 2009

(65) Prior Publication Data

US 2010/0303964 A1 Dec. 2, 2010

(51) Int. Cl.
*B65D 85/804* (2006.01)
*A47J 31/44* (2006.01)

(52) U.S. Cl.
CPC ........ *A47J 31/446* (2013.01); *B65D 85/8043* (2013.01); *Y10T 29/49826* (2015.01)

(58) Field of Classification Search
CPC ............... A47J 31/446; B65D 85/8043; Y10T 29/49826
USPC ................... 426/77, 78, 82, 86; 99/295, 323
See application file for complete search history.

(56) References Cited

U.S. PATENT DOCUMENTS

| | | | |
|---|---|---|---|
| 4,995,310 A * | 2/1991 | van der Lijn et al. | 99/295 |
| 5,840,189 A * | 11/1998 | Sylvan et al. | 210/474 |
| 6,079,315 A | 6/2000 | Beaulieu et al. | |
| 6,182,554 B1 * | 2/2001 | Beaulieu et al. | 99/289 R |
| 6,536,332 B2 | 3/2003 | Schmed | |
| 6,810,899 B2 | 11/2004 | Franz et al. | |
| 7,028,604 B2 | 4/2006 | Cortese | |
| 2002/0020659 A1 * | 2/2002 | Sweeney et al. | 210/416.3 |
| 2005/0051478 A1 * | 3/2005 | Karanikos et al. | 210/469 |
| 2005/0150390 A1 * | 7/2005 | Schifferle | 99/295 |
| 2005/0158426 A1 * | 7/2005 | Hu et al. | 426/77 |
| 2006/0107841 A1 | 5/2006 | Schifferle | |
| 2006/0174769 A1 | 8/2006 | Favre et al. | |

(Continued)

FOREIGN PATENT DOCUMENTS

| | | | |
|---|---|---|---|
| EP | 1547499 A2 * | 6/2005 | |
| JP | S51-127375 U | 10/1976 | |
| JP | H01-121524 U | 8/1989 | |

(Continued)

OTHER PUBLICATIONS

Websters Dictionary—definition of "conical" Webster's New World Dictionary, 1988, p. 294.*

(Continued)

*Primary Examiner* — Viren Thakur
(74) *Attorney, Agent, or Firm* — Wolf, Greenfield & Sacks, P.C.

(57) ABSTRACT

A cartridge for forming a beverage includes a container defining an interior space, a filter, a beverage medium contained in the interior space, and a filter guard. The filter may be arranged so that liquid that interacts with the beverage medium flows through the filter to exit the interior space. The container may include a surface arranged to be pierced by a piercing member to permit beverage to exit the container. The filter guard may be arranged to contact the piercing member to resist damage to the filter when the container surface is pierced. In one embodiment, the filter guard and filter may be in contact with the container surface that is pierced, yet damage to the filter that might be caused by the piercing element may be avoided.

23 Claims, 6 Drawing Sheets

(56) References Cited

U.S. PATENT DOCUMENTS

2006/0236871 A1    10/2006    Ternite et al.

FOREIGN PATENT DOCUMENTS

| JP | 04-236921 A | 8/1992 |
|---|---|---|
| JP | 2002-018213 A | 1/2002 |
| JP | 2004-500199 A | 1/2004 |
| JP | 2005-261921 A | 9/2005 |
| WO | WO-2008/136026 A1 | 11/2008 |
| WO | WO 2008136026 A | 11/2008 |

OTHER PUBLICATIONS

Definition of "permanent." Webster's New World Dictionary, $3^{rd}$ College Edition, 1988 Simon & Schuster.*
Definition of "tilt" Websters New World Dictionary, Third College Edition, 1988, Simon & Schuster.*
Definition of "petal." the Penguin English Dictionary, 2003, Merriam-Webster Inc. Penguin Books.*
International Search Report and Written Opinion for International Application No. PCT/US2010/036169 dated Aug. 4, 2010.

* cited by examiner

CARTRIDGE WITH FILTER GUARD

BACKGROUND

1. Field of Invention

This invention relates to a beverage cartridge to be used with a beverage forming system, such a single-serve coffee maker.

2. Related Art

Cartridges for use with beverage forming machines are well known, and may include one or more filters as well as a beverage medium, such as ground coffee beans, tea leaves, etc. In some cartridges, the filter is located between two or more portions of an interior space of the cartridge, e.g., one portion in which a beverage medium is located, and a second portion into which liquid that has passed through the filter may flow. An example of one such cartridge is disclosed in U.S. Pat. No. 5,840,189 and/or U.S. Pat. No. 6,607,762, which may be used with a beverage making machine like that described in U.S. Pat. No. 7,398,726, which patents are hereby incorporated by reference in their entirety. In use, the beverage forming machine introduces a fluid into the cartridge to interact with the beverage medium. In some machines, a piercing outlet needle of the machine is used to pierce a surface of the cartridge (e.g., a bottom wall of the cartridge container) permitting the liquid that has interacted with the beverage medium to flow through the filter and exit the cartridge.

SUMMARY OF INVENTION

The inventors have appreciated that although suitable positioning of the filter in a cartridge can help prevent damage to the filter caused by a piercing element, e.g., by positioning a lower end of a filter suitably far above a bottom of the cartridge like that shown in U.S. Patent Publication 2005/0051478, such an arrangement reduces a volume of the cartridge that is available to hold a beverage medium. For example, some beverage drinkers demand the use of relatively larger amounts of ground coffee so that a suitably strong coffee drink can be made with a single cartridge. The inventors have developed methods and apparatus to increase the available volume of a filter cartridge without increasing the overall cartridge size while reducing the risk that a filter will be damaged when pierced by an outlet needle or other piercing element.

Thus, aspects of the invention may provide benefits such as reduced waste, because the overall cartridge size may remain small while the volume available in a cartridge for holding a beverage medium is increased over prior arrangements. In addition, by maintaining a same overall size for a cartridge, a cartridge having an increased beverage medium volume may be useable with pre-existing beverage machines. That is, some beverage machines that receive and use beverage cartridges have a brew chamber that is arranged to receive a cartridge of a defined size and shape so that larger (or smaller) cartridges, or even cartridges of a different shape may not be suitable for use in the machine. By maintaining a same overall size and shape of a cartridge, benefits of larger beverage medium volume, reduced waste and/or other features may be extended into use with beverage machines that customers already own and use. Of course, aspects of the invention may allow for the reduction in overall size of cartridges as compared to prior versions. That is, since aspects of the invention may permit for the more efficient use of cartridge volume, overall cartridge size may be reduced, thereby further reducing waste associated with container materials, etc. Such advantages may be realized while maintaining beverage medium volume and/or other performance features that could previously only be provided in a larger cartridge.

In one aspect of the invention, a cartridge for use in forming a beverage includes a container defining an interior space having first and second portions. The container may have a surface, e.g., a bottom of a container that has a frustoconical shape, arranged to be pierced by a piercing element to permit a beverage to exit the interior space (or to permit a liquid to enter the interior space). A beverage medium (such as ground coffee, tea or other) may be located in the first portion of the interior space of the container and interact with liquid introduced into the container to form a beverage. A filter may be attached to the container, e.g., at the sidewall of a frustoconical container, and be arranged so that liquid that interacts with the beverage medium in the first portion of the interior space flows through the filter toward the second portion of the interior space. A filter guard may be disposed in the interior space and be arranged to contact a piercing element and resist damage to the filter when the container surface is pierced by the piercing element (e.g., for beverage outlet or liquid input). For example, the filter guard may include a disc shaped element located at the bottom of the container so that when a needle or other piercing element pierces the bottom of the frustoconical container to permit a beverage to exit the cartridge, the filter guard contacts the needle and prevents the needle from contacting the filter. As a result, the filter may be located very close to the bottom of the container in an area normally entered by the needle, yet avoid damage that might be caused by the needle upon its entry into the container.

In one embodiment, the filter guard may separate at least a portion of the container surface to be pierced and the filter, and in some instances may contact both the piercing element and the filter when the container surface is pierced. For example, the filter guard may be positioned between the filter and the container bottom and be arranged to displace at least a portion of the filter when the filter guard is contacted and displaced by the piercing element as the piercing element enters the interior space of the container. The filter guard may have any suitable arrangement e.g., may have a disc shape, such as a washer shape with a central opening, or other body with at least one channel arranged to permit liquid to flow past the body.

In another aspect of the invention, a method of manufacturing a cartridge for use with a beverage brewing machine includes providing a filter, a filter guard, and a container having an opening, an interior space and a surface arranged to be pierced to allow a beverage to exit the interior space. At least a portion of the filter may be inserted in the interior space of the container, and the filter guard inserted in the interior space of the container. The filter guard may be inserted before, after or simultaneously with insertion of the filter. The filter may be attached to the container and be arranged to receive a beverage material in a first portion of the interior space such that liquid that interacts with the beverage material flows through the filter toward a second portion of the interior space. Also, the filter guard may be arranged to contact a piercing element and resist damage to the filter when the container surface is pierced by the piercing element. The beverage medium may be placed in the first portion of the interior space of the container and be arranged to interact with the liquid introduced into the first portion of the interior space to form a beverage. Thereafter, the opening of the container may be closed, e.g., by placing a lid over the opening. The lid may be arranged to be pierced by a second piercing element to permit the liquid to enter the first portion of the interior space.

In another aspect of the invention, a beverage system includes a beverage machine having a receptacle arranged to receive a cartridge, a fluid inlet arranged to introduce liquid into the cartridge, and a fluid outlet including a piercing element arranged to pierce a surface of the cartridge. The system may also include a cartridge arranged to be received by the receptacle of the beverage machine. The cartridge may include a container defining an interior space and having the surface arranged to be pierced by a piercing element, a beverage medium in the interior space arranged to interact with liquid introduced by the fluid inlet into the container to form a beverage, a filter at least partially located in the interior space and arranged to filter liquid that interacts with the beverage medium in the interior space, and a filter guard arranged to contact the piercing element and resist damage to the filter when the container surface is pierced by the piercing element to permit a beverage to exit the interior space of the container.

In another aspect of the invention, a method of making a beverage includes providing a beverage machine having a receptacle arranged to receive a cartridge, a fluid inlet arranged to introduce liquid into the cartridge, and a fluid outlet including a piercing element arranged to pierce a surface of the cartridge. A cartridge may be provided in the receptacle of the beverage machine, where the cartridge includes a container with an interior space, and a filter and filter guard both located in the interior space and near a surface of the cartridge. The surface of the cartridge may be pierced with the piercing element so as to form an opening in the surface to permit a beverage to exit the container, and the piercing element may be contacted with the filter guard to resist damage to the filter. The method may also include introducing a liquid into the interior space by way of the fluid inlet, and permitting a beverage to exit the cartridge through the opening formed by the piercing element.

These and other aspects of the invention will be apparent from the following description and claims.

BRIEF DESCRIPTION OF DRAWINGS

Aspects of the invention are described below with reference to the following drawings in which like numerals reference like elements, and wherein.

DETAILED DESCRIPTION

It should be understood that aspects of the invention are described herein with reference to the figures, which show illustrative embodiments. The illustrative embodiments described herein are not necessarily intended to show all aspects of the invention, but rather are used to describe a few illustrative embodiments. Thus, aspects of the invention are not intended to be construed narrowly in view of the illustrative embodiments. In addition, it should be understood that aspects of the invention may be used alone or in any suitable combination with other aspects of the invention.

Figure 1:
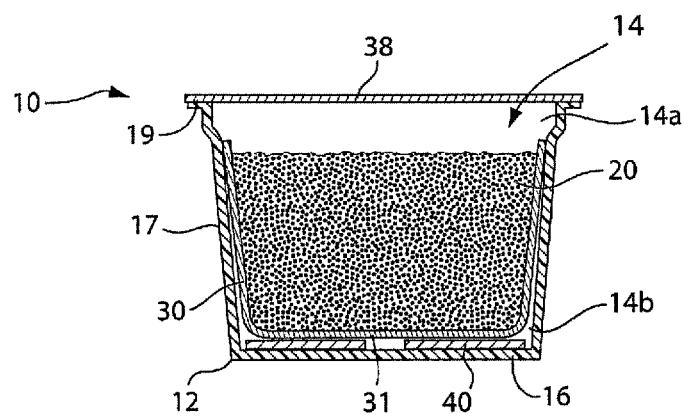
FIG. 1 is a side cross-sectional view of a cartridge in accordance with aspects of the invention.
Figure 2:
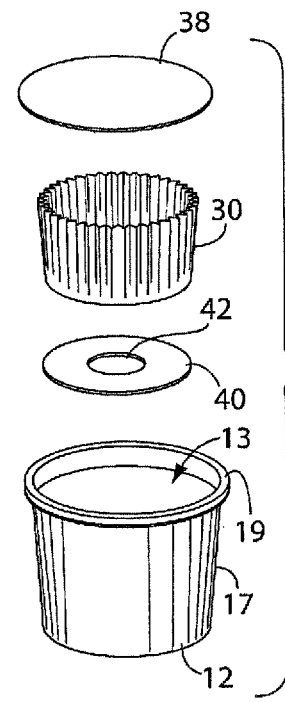
FIG. 2 is an exploded perspective view of the cartridge of FIG. 1.

FIGS. 1 and 2 show a side cross-sectional view and an exploded perspective view, respectively, of an illustrative cartridge 10 that incorporates one or more aspects of the invention. The cartridge 10 may be used in a beverage machine to form any suitable beverage such as tea, coffee, other infusion-type beverages, beverages formed from a liquid or powdered concentrate, etc. Thus, the cartridge 10 may contain any suitable beverage medium 20, e.g., ground coffee, tea leaves, dry herbal tea, powdered beverage concentrate, and/or other beverage-making material (such as powdered milk). In one illustrative embodiment, the cartridge 10 contains a beverage medium 20 that is configured for use with a machine that forms coffee and/or tea beverages, however, aspects of the invention are not limited in this respect.

In this illustrative embodiment, the cartridge 10 includes a container 12 that includes an interior space 14 having a first portion 14a and a second portion 14b. It should be understood, however, that other additional portions of the interior space and/or sub-portions of the first and second portions, may be provided in other embodiments. For example, it is possible for the cartridge to have two interior space portions that respectively hold different beverage media, and so on. In this embodiment, the container 12 may have a frustoconical cup shape with a sidewall 17 and an opening 13. However, in other embodiments, the container 12 may have a fluted, conical, or cylindrical shape, may be in the form of a square cup, a domed cup, a sphere or other suitable form, may have a fluted, corrugated, or otherwise shaped sidewall, and so on. Also, the container 12 need not necessarily have a defined shape, as is the case with some beverage sachets and pods. For example, although the container 12 in this embodiment has a relatively rigid and/or resilient construction so that the container 12 tends to maintain its shape, the container 12 could be made to have a more compliant and/or deformable arrangement, e.g., like a sachet container made from a sheet of deformable material. Thus, an interior space defined by the container 12 may be formed only after the container material is formed around a beverage medium, filter and/or other cartridge components, such as when two filter paper layers (container material) are joined together around a charge of coffee grounds to form a cartridge.

If the container 12 includes an opening 13, the opening 13 may be closed by a lid 38, e.g., a foil and polymer laminate material that is attached to a rim 19 of the container 12. Of course, a lid 38 is not necessary, e.g., where the container is arranged in a sachet-type or pod-type configuration. The container 12 and/or the lid 38 may provide a barrier to moisture and/or gases, such as oxygen. For example, the container 12 may be made of a polymer laminate, e.g., formed from a sheet including a layer of polystyrene or polypropylene and a layer of EVOH and/or other barrier material. Such an arrangement may provide suitable protection for the beverage medium 20, e.g., from unwanted exposure from moisture, oxygen and/or other materials. In other embodiments, the interior space 14 may be enclosed by a permeable covering, such as a filter paper, a polymer sheet, a mesh layer, or other permeable material, or in some other manner, as the invention is not limited in this regard.

The cartridge 10 may also include a filter 30 attached to the container 12 (or not) and at least partially located in the interior space 14. The filter 30 may be arranged between the first and second portions 14a and 14b of the interior space 14 so that liquid in the first portion 14a of the interior space that interacts with beverage medium 20 flows through the filter 30 and toward the second portion 14b of the interior space 14 before exiting the container 12. The filter 30 may be entirely located in the interior space 14 or portions of the filter 30 may extend outside the interior space 14, as aspects of the invention are limited in this respect. For example, portions of the filter 30 may be joined to the lid 38 and/or between the lid 38 and the rim 19, and thus be located outside of the interior space 14. In addition, the filter 30 may include one or more portions that function to filter liquid passing through the filter 30, as well as portions that are impermeable or otherwise restrict flow. The filter 30 may be the only element in the interior space 14 that separates the first and second portions 14a and 14b, or other components, such as walls, ribs, or other structures in addition to the filter 30 may physically separate two or more portions of the interior space 14 from each other. However, in a flow sense, the filter 30 may be the only component that separates or divides two or more portions of the interior space 14, e.g., liquid may need to flow through the filter 30 to pass from the first portion 14a to the second portion 14b. Of course, the filter 30 may have multiple stages, e.g., a coarse filter portion that filters out relatively large particles, followed by a fine filter portion that filters relatively smaller particles. Thus, the filter 30 may include two or more separate components, if desired.

In this illustrative embodiment, the filter 30 may have a substantially frustoconical shape with fluted sidewalls and a generally flat bottom 31, as shown. However, the filter 30 may have any suitable shape, such as a cylindrical shape, a square cup shape, a domed shape, a flat sheet, or other. The filter 30 may be attached to the container 12 in any suitable way, such as by an adhesive, thermal welding, a mechanical interference fit, etc. In this illustrative embodiment, the filter 30 may include a combination of polypropylene and cellulose materials and may be attached to the container sidewall 17 at an upper portion of the filter 30 by thermal welding, but the filter 30 may be attached to a rim 19 of the container 12, or in any other suitable location.

In accordance with an aspect of the invention, a cartridge may include a protective element, e.g., a filter guard, that resists damage to the filter that may be caused by a piercing element that forms an opening in the cartridge to allow liquid flow into and/or out of the cartridge. For example, in some embodiments, damage to the filter may cause coffee grounds or other beverage media to undesirably bypass the filter and end up in the finished beverage. In one aspect, the filter guard may resist damage to the filter even in a situation where the exact location at which the cartridge is pierced is unknown prior to piercing. Thus, the cartridge may be pierced in any one of several different locations, yet the filter guard may resist damage that one or more piercing elements may cause to the filter. Accordingly, a filter guard may permit a filter to be initially located at or near a surface of the cartridge that is pierced, yet resist damage to the filter. In some embodiments, the filter guard may cause the filter to move away from the piercing element(s), thereby resisting filter damage. One possible advantage of the use of a filter guard in some embodiments may be to reduce the overall size of the cartridge, and/or increase an available volume in the cartridge for beverage media, since the filter may be positioned at or near the cartridge walls, even in places where the cartridge is likely to be pierced. Thus, the interior space of the cartridge may be more efficiently used.

In other embodiments, aspects of the invention may help resist filter damage in circumstances where a filter is unintentionally placed at or near a cartridge surface to be pierced. For example, in a cartridge like that shown in U.S. Pat. No. 5,840,189 or U.S. Patent Publication 2005/0051478, errors in the manufacturing process may unintentionally position a filter lower in the cartridge than normal or otherwise close to a point at which the cartridge is pierced, potentially exposing the filter to the piercing exit needle. However, if a filter guard in accordance with one or more aspects of the invention is provided, damage to the filter may be resisted.

In accordance with another aspect of the invention, a component in a cartridge, such as a filter, may be moved by a piercing element that pierces the cartridge so as to change a volume of at least one portion of the interior space of the cartridge. For example, in one embodiment, a piercing element that forms an outlet opening in the cartridge may contact a filter (at least indirectly) and move a portion of the filter so as to increase a volume of a portion of the interior space that is downstream of the filter. This increase in volume may allow space for the piercing element, allow for easier flow of beverage out of the cartridge, and/or other features.

In accordance with one or more aspects of the invention, the cartridge 10 shown in FIGS. 1 and 2 includes a filter guard 40 (in this case at the bottom of the container 12 between a bottom 16 of the container 12 and a bottom 31 of the filter 30). Although the filter guard 40 may take any one of several different forms, in this embodiment, the filter guard 40 has a disc shape with an opening 42 near a center (e.g., a washer-like shape). During assembly of the cartridge 10, the filter guard 40 may be dropped into the container 12, and then the filter 30 placed into the container 12 and attached to the container sidewall 17 (e.g., by welding the filter 30 near its top edge to the sidewall 17). As shown in FIG. 1, the filter 30 may be placed at or near the bottom 16 of the container 12 with the filter guard 40 positioned between the bottom 16 and the bottom 31 of the filter 30. In other embodiments, the filter 30 may be positioned in the container 12 so that the filter bottom 31 is located at some distance above the bottom 16 of the container 12, if desired. A beverage medium 20 may be placed in the cartridge 10, and the lid 38 attached to the container 12 to close the opening 13. In either case, tolerances regarding proper vertical placement of the filter 30 in the container 12 may be relieved, since a filter 30 placed low in the container 12 may be protected from damage by the filter guard 40.

Figure 3:
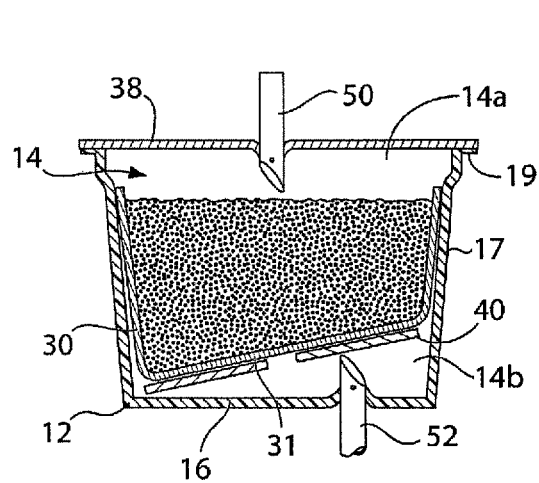
FIG. 3 is a side cross-sectional view of the cartridge of FIG. 1 after a surface of the cartridge is pierced by a piercing element.

For example, as shown in FIG. 3, when the cartridge 10 is used to make a beverage, the lid 38 may be pierced by an inlet piercing element 50 (e.g., a needle) so that water or other liquid may be introduced into the cartridge 10. Other inlet piercing arrangements are possible, such as multiple needles, a shower head, a non-hollow needle, a cone, a pyramid, a knife, a blade, etc. A beverage machine may include multiple piercing elements of the same type or of different types, as the invention is not limited in this respect. In another arrangement, a beverage machine may include a piercing element that forms a hole in a container surface and thereafter a second piercing element may pass through the formed hole to introduce liquid into (or conduct liquid out of) the container. Also, although a filter guard is not used in this embodiment to help resist damage to the filter 30 that may be caused by the inlet piercing element 50, other cartridge arrangements may incorporate a filter guard for such purposes.

The cartridge 10 may also penetrated by an outlet piercing element 52 (e.g., a needle) at a bottom 16 of the container 12. As can be seen in FIG. 3, the outlet piercing element 52 penetrates the bottom 16 and contacts the filter guard 40, pushing the filter guard 40 and a portion of the filter 30 upwardly. In some embodiments, the piercing element 52 may always extend about the same distance into the cartridge 10, e.g., up to about 0.25 inches into the cartridge 10. However, piercing element extension into the cartridge may vary in length, width or other parameters as different sizes, types and configurations of piercing elements fall within the scope of the invention. In this illustrative embodiment, the piercing element 52 remains in place so as to permit beverage to exit the opening formed in the container 12. However, in other embodiments, the piercing element 52 may withdraw after forming an opening, allowing beverage to exit the opening without the piercing element 52 being extended into the cartridge 10.

Although the piercing element 52 may have one or more sharp leading edges or points, the filter guard 40 may be arranged to help protect the filter 30 from damage that might otherwise be caused by the piercing element 52. Note also that in this embodiment, the second portion 14*b* of the interior space 14 is enlarged by upward movement of the filter guard 40 and filter 30. This may provide improved flow of beverage in the second portion 14*b* to the piercing element 52 and/or the opening in the bottom 16 formed by the piercing element 52. In this embodiment, the outlet piercing element 52 is expected to pierce the bottom 16 of the container 12 in an annular area spaced inwardly from the edge of the container 12 where the sidewall 17 and bottom 16 meet. Thus, the filter guard 40 may be arranged with an opening 42 near the center (e.g., to help the passage of beverage through the bottom 31 of the filter 30), since the piercing element 52 will not pierce the bottom 16 in that location. However, the filter guard 40 may be configured differently for different piercing arrangements.

Figure 4:
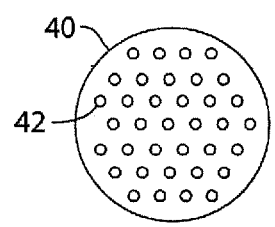
FIG. 4 is a plan view of an illustrative embodiment for a filter guard having multiple channels in accordance with aspects of the invention.
Figure 5:
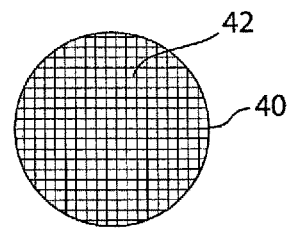
FIG. 5 is a plan view of an illustrative embodiment for a mesh filter guard in accordance with aspects of the invention.
Figure 6:
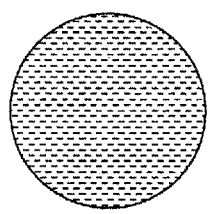
FIG. 6 is a plan view of an illustrative embodiment for a filter guard that includes a porous material in accordance with aspects of the invention.
Figure 7:
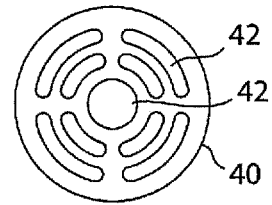
FIG. 7 is a plan view of an illustrative embodiment for a filter guard having arcuate channels in accordance with aspects of the invention.

For example, as shown in FIG. 4, a filter guard 40 may include multiple channels 42 that permit liquid to flow through the filter guard 40. The channels 62 (in this embodiment having the form of circular holes) may be sized to prevent contact of a piercing element 52 with a filter 30, even if a point or edge of the piercing element 52 is received into one of the channels 42. Of course, the channels 42 may be arranged in any suitable way, such as in an array of square holes of a mesh screen, as shown in FIG. 5, or an array of smaller circular holes in a plate, as shown in FIG. 6. FIG. 7 shows another embodiment of a filter guard 40 in which channels 42 are arranged in non-circular and/or multiple different cross-sectional shapes. In FIG. 7, a circular channel 42 is located near the center of the filter guard 40 with and multiple arcuate slot-shaped channels 42 arranged around the central circular channel 42. Other arrangements are possible, such as a layer of sponge-like or other porous material, which may also provide a filtering function, if desired.

Figure 8:
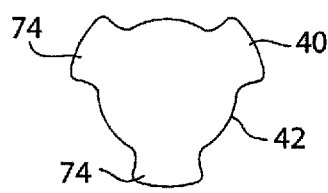
FIG. 8 is a plan view of an illustrative embodiment for a filter guard having protrusions and channels located at the periphery in accordance with aspects of the invention.

Although FIGS. 4-7 show filter guards that each have a circular outer perimeter, a filter guard may have other shapes, e.g., which may depend on the type or shape of cartridge or other features. For example, as shown in FIG. 8, a filter guard 40 may include one or more projections 74 that may help the filter guard 40 from shifting laterally in a container 12 of a cartridge 10, e.g., a container 12 having a circularly shaped bottom 16. In some embodiments, the projections 74 may enable the filter guard 40 to form an interference fit with an interior portion of the container 12. In this embodiment, channels 42 are located at the periphery of the filter guard 40 between the projections 74. Additional channels may be provided, e.g., in the center of the filter guard 40 or elsewhere.

Figure 9:
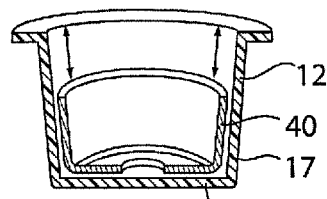
FIG. 9 is a side cross-sectional view of an illustrative embodiment for a filter guard adapted to move vertically and/or horizontally with respect to a container of a cartridge in accordance with aspects of the invention.

As discussed above, the filter guard 40 in the FIG. 3 embodiment may be configured to pivot or tilt when contacted by a piercing member. However, a filter guard 40 may move in other ways when contacted by a piercing element. For example, FIG. 9 shows a filter guard 40 that has a generally cup-like shape similar to the container 12 in which the filter guard 40 is located. In one embodiment in which the filter guard 40 is used with a frustoconically shaped container 12 like that in FIGS. 1-3, the filter guard 40 may similarly have a frustoconical shape and be sized to slide in a vertical direction relative to the container 12 when contacted by a piercing element from the bottom of the container 12. This type of arrangement in FIG. 9 may also be useable in an arrangement in which the outlet piercing element(s) penetrate the container 12 at the sidewall 17. In that case, the filter guard 40 may be made to move laterally, or side-to-side, in the container 12 to permit movement of the piercing element into the interior space 14 while resisting damage to the filter 30.

Figure 10:
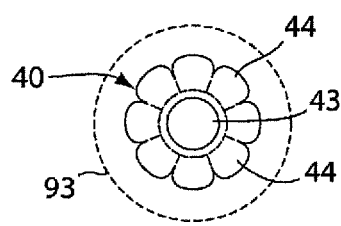
FIG. 10 is a plan view of a filter guard having a central portion adapted to be attached to a container of a cartridge and having extensions adapted to move with respect to the container of the cartridge in accordance with aspects of the invention.
Figure 11:
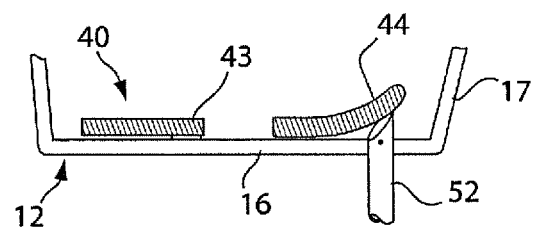
FIG. 11 is a side cross-sectional view of the filter guard of FIG. 10 attached to the container of the cartridge.

In other embodiments, a filter guard may be attached to a container and/or a filter (e.g. slidably coupled, pivotably coupled, rotatably coupled, etc.). For example, in one embodiment, a filter guard 40 may have an interference fit with the container 12 so that the filter guard 40 is not movable relative to the container 12. In other embodiments, one or more portions of the filter guard 40 may be immovably attached to the container 12 or filter 30, while other portions of the filter guard 40 may remain movable. For example, FIGS. 10 and 11 show a filter guard 40 that is attached to a bottom 16 of a container 12 that has a frustoconical shape. FIG. 10 shows a top view of the filter guard 40 with a dotted outline 93 indicating a perimeter of a bottom 16 of container 12. A central portion 43 of filter guard 40 is attached to the container 12, e.g., by an adhesive, by being integrally molded with the container 12, etc. Extension portions 44 of the filter guard 40 may have a "flower petal"-like shape and extend from the central portion 43. The extension portions 44 may be configured to bend or tilt (as shown on the right in FIG. 11) when contacted by a piercing element 52. Thus, one portion of the filter guard 40 (an extension portion 44) may move to permit penetration of a piercing element and resist contact of the piercing element with a filter 30, while other portions of the filter guard 40 remain stationary relative to the container 12 and/or the filter 30. Other similar arrangements will occur to those of skill in the art, such as flaps, guides, baffles or other features that may be fixed in the container 12 and function as a filter guard. In another embodiment, a filter guard 40 may be fixed to a filter 30, such as at the bottom 31 of the filter 30 in the FIGS. 1-3 embodiment. This may ease construction of the cartridge, e.g., by reducing the number of parts to be assembled. In such a case, the filter guard may be formed integrally with the filter 30, such as by adhering a disc-shaped element to the filter bottom 31, applying a hot glue or other material to the filter bottom 31 to resist damage to the filter, and so on.

The filter guard may include materials that are sufficiently tough and/or sufficiently rigid to reduce damage to the filter from a puncturing member. Non-limiting examples of such a material include: a material that is flexible, but tough; a material that is rigid, but brittle; a material that is stretchable or resilient, but tear resistant; a material that is tough and rigid, etc. A filter guard may be formed of one material or multiple different materials having different material properties. A filter guard may include one component, multiple components that are separate, or multiple components that are coupled to each other. Those of skill in the art will recognize that a filter guard may have many different configurations and may be formed of many different suitable materials or combinations of materials, such as polymers, metals, and so on.

Figure 12:
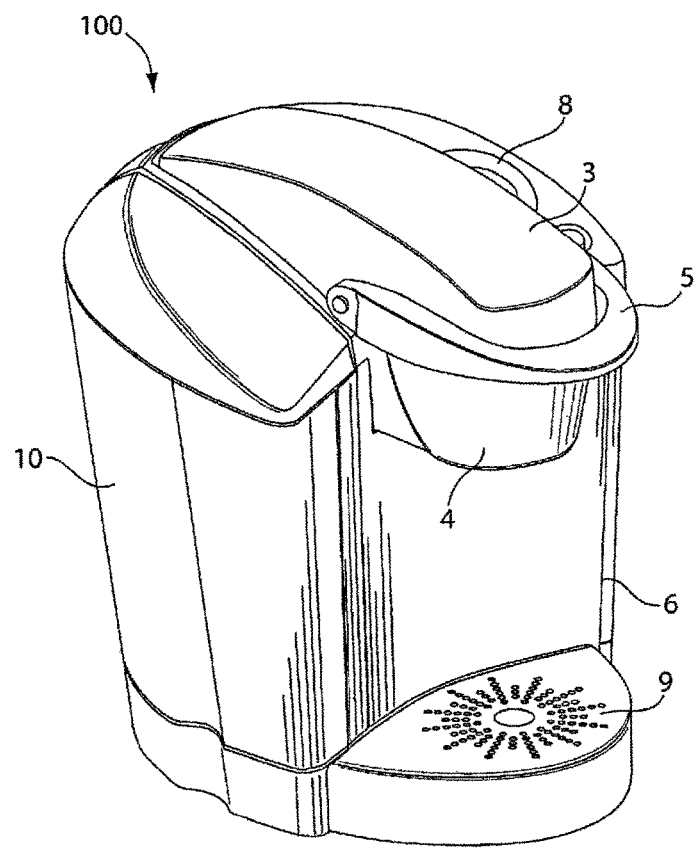
FIG. 12 is a perspective view of a beverage machine usable in accordance with aspects of the invention.
Figure 13:
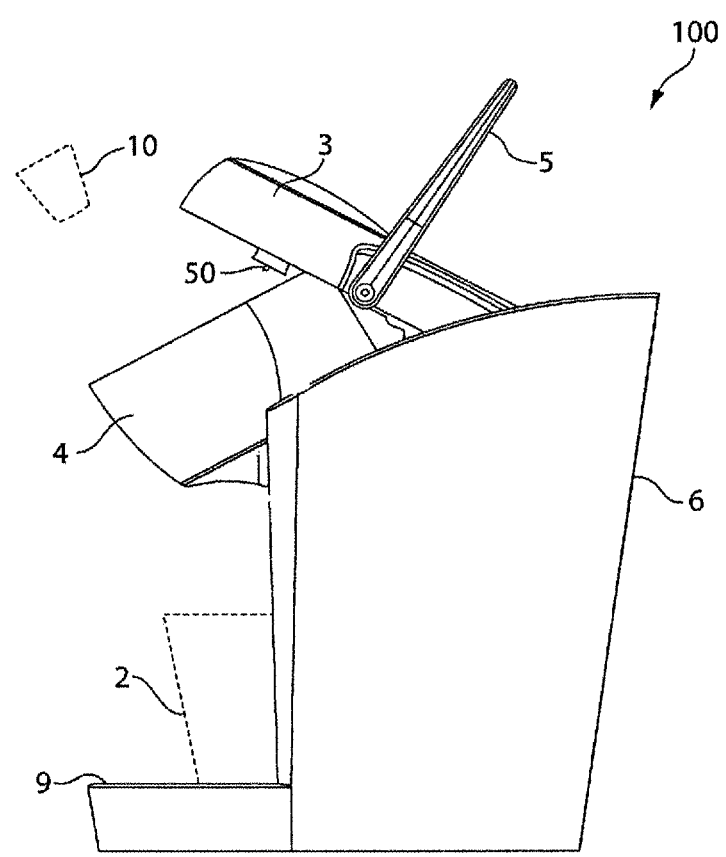
FIG. 13 is a side view of the beverage machine of FIG. 12.

Another aspect of the invention relates to the formation of a beverage using a cartridge incorporating a filter guard. As discussed above, the cartridge may take a variety of different arrangements, but in this embodiment has the same general form as that shown in FIGS. 1-3. The cartridge may be used with any suitable beverage machine, such as any one of the brewers currently sold by Keurig, Incorporated of Reading, Mass. For example, FIGS. 12 and 13 show a perspective view and a side view, respectively, of a beverage forming apparatus 100 that may be used to form any suitable beverage, such as tea, coffee, other infusion-type beverages, beverages formed from a liquid or powdered concentrate, or other. However, in this illustrative embodiment, the apparatus 100 is arranged to form coffee or tea beverages and includes an outer frame or housing 6 with a user interface 8 that the user may operate to control various features of the apparatus 100. As is known in the art, a beverage cartridge 10 may be provided to the apparatus 100 and used to form a beverage that is deposited into a cup 2 or other suitable container that is placed on a drip tray 9 or other support, if any. The cartridge 10 may be manually or automatically placed in a cartridge receiving portion defined by first and second portions 3 and 4 of the beverage forming apparatus 100. For example, by lifting a handle 5, the user may move the first and second portions 3 and 4 to an open position to expose a cup-shaped or otherwise suitably shaped area in which the cartridge 10 may be placed. After placement of the cartridge 10, a handle 5 or other actuator may be moved in a manual or automatic fashion so as to move the first and second portions 3 and 4 to a closed position (shown in FIG. 1), thereby at least partially enclosing the cartridge 10 within a brew chamber. It should be understood, however, that the cartridge 10 may be received in any suitable way by the apparatus 100, as the way in which the apparatus 100 receives or otherwise uses the cartridge 10 is not critical to aspects of the invention.

Once the cartridge 10 is received, the beverage forming apparatus 100 may use the cartridge 10 to form a beverage. For example, one or more inlet needles 50 (see FIG. 13) associated with the first portion 3 may pierce the cartridge 10 so as to inject heated water or other liquid into the cartridge 10. The injected liquid may form the desired beverage or a beverage precursor (i.e., a substance used in a further operation to form a beverage, such as by the addition of milk, a flavoring, etc.). The second portion 4 may also include one or more outlet needles or other elements 52 (not shown in FIGS. 12 and 13) to puncture or pierce the cartridge 10 (as needed) at an outlet side to permit the formed beverage to exit the cartridge 10 (see FIG. 3, for example).

Figure 14:
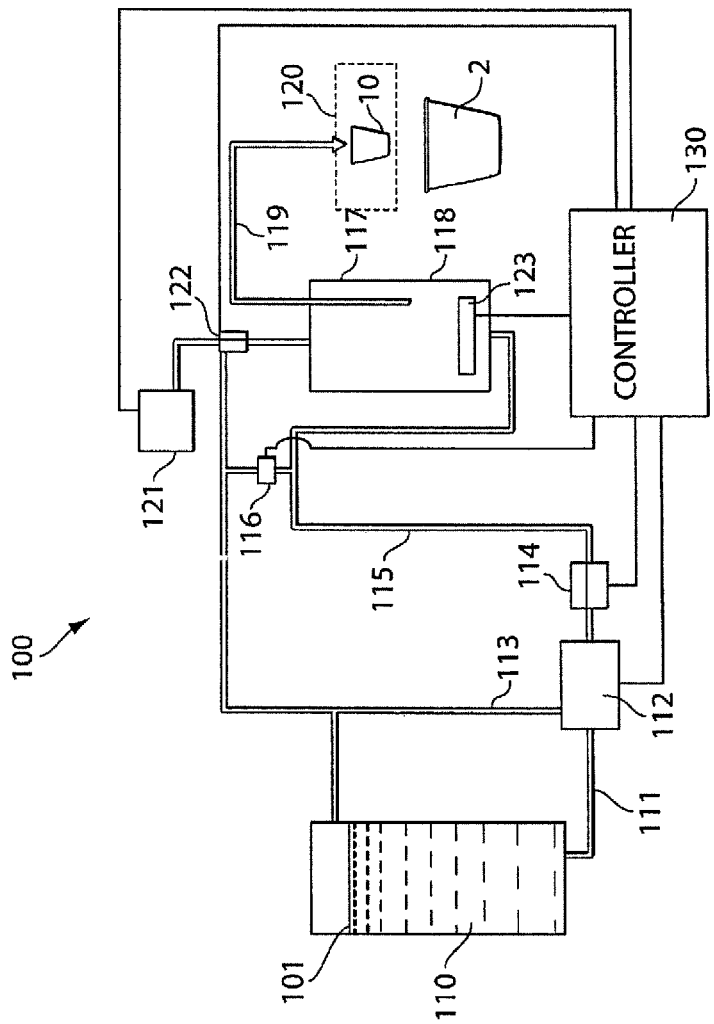
FIG. 14 is a schematic block diagram of components of a beverage machine usable in accordance with aspects of the invention.

FIG. 14 shows a schematic block diagram of various components included in a beverage forming apparatus 100 in one illustrative embodiment. Those of skill in the art will appreciate that a beverage forming apparatus 100 may be configured in a variety of different ways, and thus aspects of the invention should not be narrowly interpreted as relating only to one type of beverage forming apparatus. Water or other liquid from a storage tank 110 may be provided via a supply conduit 111 to a pump 112 (such as a centrifugal pump), which pumps the liquid via a pump conduit 115 to a metering tank or chamber 118. Operation of the water pump 112 and other components of the apparatus 100 may be controlled by a controller 130, e.g., including a programmed processor and/or other data processing device along with suitable software or other operating instructions, one or more memories, temperature and liquid level sensors, pressure sensors, input/output interfaces, communication buses or other links, a display, switches, relays, triacs, or other components necessary to perform desired input/output or other functions. The metering tank 118 may be filled with a desired amount of liquid by any suitable technique, such as running the pump 112 for a predetermined time, sensing a water level in the metering tank 118 using a conductive probe sensor or capacitive sensor, detecting a pressure rise in metering tank 118 when the liquid fills the tank, or using any other viable technique. For example, the controller 130 may detect that the metering tank 118 is completely filled when a pressure sensor detects a rise in pressure indicating that the water has reached the top of the metering tank 118. Water in the tank may be heated, if desired, by way of a heating element 123 whose operation is controlled by the controller 130 using input from a temperature sensor or other suitable input. Water in the metering tank 118 may be dispensed via a metering tank conduit 119 to a brew chamber 120 or other beverage forming station. The brew chamber 120 may include any beverage making ingredient, such as ground coffee, tea, a flavored drink mix, or other substance, e.g., contained in a cartridge 10. Liquid may be discharged from the metering tank 118 by pressurizing the metering tank with air provided by an air pump 121 that causes the liquid to be discharged out of a tube 117 and into the metering tank conduit 119. Completion of the dispensing from the metering tank 118 may be detected in any suitable way, such as by detecting a pressure drop in the metering tank 118, by detecting a water level change in the metering tank 118, or using any other viable techniques. Liquid may alternately be discharged from the metering tank 118 by the pump 112 operating to force additional liquid into the tank 118, thereby displacing water out of the tank 118 and to the brew chamber. A flow sensor or other suitable device may be used to determine the amount of liquid delivered to the tank 118, and thus the amount of liquid delivered to the brew chamber. Alternately, the pump 12 may be a piston-type or metering pump such that a known volume of liquid may be delivered from the pump 112 to the tank 118, thus causing the same known volume to be delivered to the brew chamber 120. Liquid may be introduced into the cartridge 10 at any suitable pressure, e.g., 1-2 psi or higher.

Figure 15:
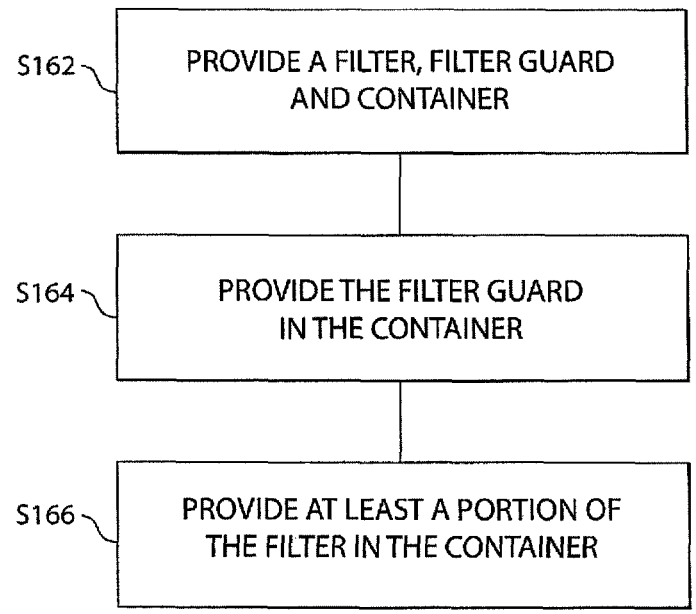
FIG. 15 shows steps in a method of manufacturing a cartridge in accordance with aspects of the invention.

Another aspect of the invention includes a method of manufacturing a cartridge. Steps of one such illustrative method are shown in FIG. 15. In step, S162, a filter, a filter guard and a container are provided. The container may have any suitable shape, size and/or configuration and may include an interior space and a surface configured to be pierced, e.g., to allow exit of a beverage from the container. The container may have a defined shape, e.g., as with a thermo-molded plastic material having a frustoconical cup shape, or may have a relatively undefined shape, such as with a sachet-type configuration in which the container is formed by a flexible sheet of material. The filter may have any suitable arrangement, including material, size, shape, and/or configuration. For example, the filter may include a sheet of filter paper that is arranged to allow a liquid and dissolved and/or suspended materials of a certain size to pass, yet prevent relatively large particles from flowing through the filter. The filter guard may likewise have any suitable arrangement, and be arranged to help resist damage to the filter that may be caused by a piercing element that penetrates the cartridge. For example, the filter guard may be interposed between the filter and the piercing element, preventing contact between the piercing element and filter after the piercing element has penetrated the cartridge.

In step S164, the filter guard may be provided in an interior space of the cartridge container, e.g., by being inserted into the interior space through an opening of the container. The filter guard may be provided into the interior space in any suitable way, such as by dropping the filter guard into the container, molding or otherwise forming the filter guard integrally with the container, adhering or otherwise fixing the filter guard to the container, attaching the filter guard to the filter, and so on.

In step S166, at least a portion of the filter may be provided in the interior space of the container. At least a portion of the filter may be provided in the container in any suitable way, such as by dropping the filter into the container, forming a portion of the filter integrally with the container, affixing the filter to another element, such as the filter guard, and placing the combined filter/element in the container, welding or otherwise securing the filter to the container, and so on. The filter may be arranged to receive a beverage medium in a first portion of the interior space of the cartridge so that a liquid that interacts with the beverage material flows through the filter into a second portion of the interior space. In some embodiments, the method may optionally include placing a beverage medium in the interior space of the container, and closing an opening of container with a lid. Also, although FIG. 15 shows steps occurring in a particular order, the steps may be performed in other orders. For example, the step of providing at least a portion of the filter in the container may be performed before the filter guard is provided in the container. Also, some steps may be incorporated into other steps, as the invention is not limited in this regard. For example, the step of providing the filter in the container may include attaching the filter to the container.

Figure 16:
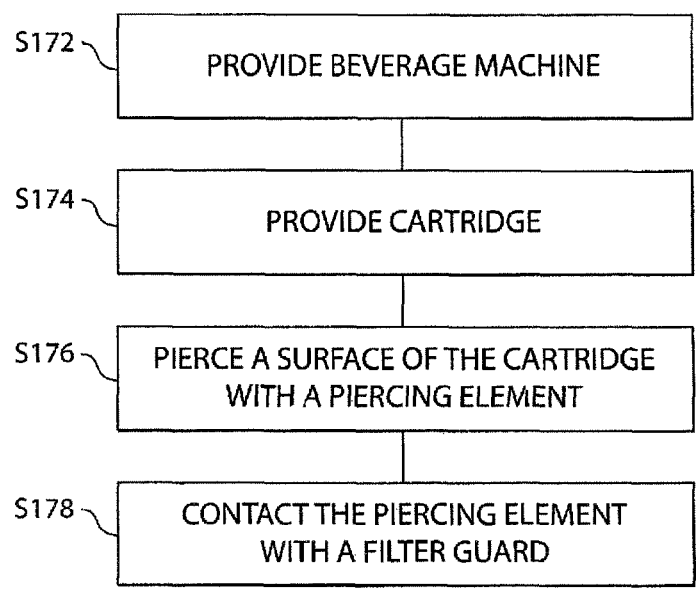
FIG. 16 shows steps in a method of preparing a beverage in accordance with aspects of the invention.

Another aspect of the invention includes forming a beverage using a beverage machine and cartridge. One illustrative set of steps in such a method is shown in FIG. 16. In step S172, a beverage machine is provided that includes a receptacle arranged to receive a cartridge, a fluid inlet arranged to introduce liquid into the cartridge, and a fluid outlet including a piercing element arranged to pierce a surface of the cartridge. In step S174, a cartridge is provided in the receptacle that includes a container with an interior space, and a beverage medium, a filter and a filter guard in the interior space. The filter may be arranged to filter liquid that interacts with the beverage medium in the interior space, and the filter and filter guard may be positioned at or near the surface of the cartridge to be pierced. In step S176, a surface of the cartridge is pierced with the piercing element so as to form an opening in the surface to permit a beverage to exit the cartridge. As discussed above, the piercing element may remain engaged with the cartridge, or may withdraw to allow beverage to exit through the formed opening. In step S180, the piercing element may be contacted by the filter guard to resist damage to the filter when the piercing element extends into the interior space. In one embodiment, the piercing element may move or otherwise displace the filter guard and/or the filter when extending into the interior space. The method may also include introducing a liquid, such as water, into the interior space, and allowing a beverage that is formed by the liquid interacting with the beverage medium to exit through the opening formed in the surface of the container.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A cartridge for use in forming a beverage, the cartridge comprising:
   a container defining an interior space having first and second portions, the container having a surface including an annular area at a bottom of the container arranged to be pierced by a piercing element to permit a beverage to exit the interior space, the annular area being positioned around a center of the bottom and excluding the center of the bottom;
   a beverage medium arranged to interact with liquid introduced into the container to form a beverage, the beverage medium being located in the first portion of the interior space;
   a filter at least partially located in the interior space, the filter separating the first and second portions of the interior space so that liquid that interacts with the beverage medium in the first portion of the interior space must flow through the filter to pass to the second portion of the interior space; and
   a filter guard disposed in the interior space and positioned between the bottom of the container and the filter such that the filter is positioned above the filter guard and the annular area of the container is positioned below the filter guard, the filter guard constructed and arranged to contact a point of a piercing element that pierces the bottom of the container at any one of multiple locations within the annular area, extends into the interior space and remains in place to permit a beverage to exit the interior space, the filter guard constructed and arranged to move within the interior space away from the bottom to displace and deform the filter upon contact with the piercing element so as to increase a volume of the second portion of the interior space, and remain in contact with the point of the piercing element and resist damage to the filter by the piercing element as liquid is introduced into the container under pressure during use in forming a beverage, wherein the filter guard is arranged to provide a flow channel at a periphery of the filter guard between the filter guard and the container when moved with contact with the piercing element to allow beverage that flows through the filter to flow past the filter guard toward the bottom of the container via the flow channel during use in forming the beverage.

2. The cartridge of claim 1, wherein the filter guard is arranged to contact both the piercing element and the filter when the container surface is pierced.

3. The cartridge of claim 1, wherein the filter guard is arranged to displace and deform the filter upon contact with a piercing element such that a portion of the filter above the piercing element is displaced to a greater height above the bottom than a portion of the filter located above a part of the annular area that is not pierced by the piercing element.

4. The cartridge of claim 1, wherein the filter guard includes a portion that is immovably attached to the container.

5. The cartridge of claim 1, wherein the container has an opening that is closed by a lid arranged to be pierced by a second piercing element to permit liquid to be introduced into the first portion of the interior space.

6. The cartridge of claim 1, wherein the filter guard has a disc shape.

7. The cartridge of claim 1, wherein the filter guard comprises a body with at least one channel arranged to permit liquid to flow past the body.

8. The cartridge of claim 1, wherein the filter guard separates at least a portion of the container surface to be pierced and the filter.

9. The cartridge of claim 1, wherein the filter guard is attached to the filter.

10. The cartridge of claim 1, wherein the container has a frustoconical shape, the filter has a fluted or conical shape, the filter is attached to at least the sidewall of the container, and the filter guard includes a disc shaped body at the bottom of the container.

11. The cartridge of claim 1, wherein at least a portion of the filter adjacent the filter guard is in contact with the filter guard.

12. The cartridge of claim 11, wherein a bottom of the filter is in contact with the filter guard.

13. The cartridge of claim 1, wherein at least a part of the filter guard is attached to the filter in the interior space.

14. The cartridge of claim 1, wherein the container provides a barrier to protect the beverage material from moisture or oxygen.

15. A method of manufacturing a cartridge for use with a beverage brewing machine, comprising:

providing a filter, a filter guard and a container having an opening, an interior space and a surface including an annular area at a bottom of the container arranged to be pierced to allow a beverage to exit the interior space, the annular area being positioned around a center of the bottom and excluding the center of the bottom;

inserting at least a portion of the filter in the interior space of the container;

inserting the filter guard in the interior space of the container; and providing a beverage material in a first portion of the interior space to interact with liquid introduced into the first portion of the interior space to form a beverage that flows through the filter toward a second portion of the interior space, the filter being arranged such that liquid that interacts with the beverage medium in the first portion of the interior space must flow through the filter to pass to the second portion of the interior space;

wherein the filter guard is constructed and arranged to have a portion positioned between the container surface and a portion of the filter to contact a point of a piercing element that pierces the bottom of the container at any one of multiple locations within the annular area, extends into the interior space and remains in place to permit a beverage to exit the interior space, the filter guard constructed and arranged to move within the interior space away from the bottom to displace and deform the filter upon contact with the piercing element, and remain in contact with the point of the piercing element and resist damage to the filter by the piercing element as liquid is introduced into the container under pressure during use in forming a beverage, wherein the filter guard is arranged to provide a flow channel at a periphery of the filter guard between the filter guard and the container when moved with contact with the piercing element to allow beverage that flows through the filter to flow past the filter guard toward the bottom of the container via the flow channel during use in forming the beverage.

16. The method of claim 15, further comprising closing the opening of the container.

17. The method of claim 16, wherein the opening of the container is closed by a lid that is arranged to be pierced by a second piercing element to permit the liquid to enter the first portion of the interior space.

18. The method of claim 15, wherein the container has a frustoconical shape with a sidewall and a bottom, the filter has a fluted or conical shape, the filter is attached to at least a sidewall of the container, and the filter guard is positioned at the bottom of the container.

19. A cartridge for use in forming a beverage, the cartridge comprising:

a container defining an interior space having first and second portions, the container having a surface arranged to be pierced by a piercing element to permit a beverage to exit the interior space;

a beverage medium arranged to interact with liquid introduced into the container to form a beverage, the beverage medium being located in the first portion of the interior space;

a filter at least partially located in the interior space and defining a cup shape in which beverage medium is received, the filter being arranged so that liquid that interacts with the beverage medium in the first portion of the interior space must flow through the filter to pass to the second portion of the interior space; and a filter guard disposed in the interior space, the filter guard having a plurality of extension portions positioned between the surface and a portion of the filter, each extension portion constructed and arranged to contact a piercing element that pierces the bottom of the container within the surface to permit a beverage to exit the interior space, move within the interior space to displace and deform the cup shape of the filter upon contact with the piercing element, and resist damage to the filter by the piercing element, each of the extension portions having a petal shape with a portion that is fixed to the container and a movable portion arranged to move relative to the fixed portion with contact of the piercing element, the extension portions being arranged to remain stationary relative to the container when the movable portion of another one of the extension portions moves with contact with the piercing element.

20. The cartridge of claim 19, wherein the surface arranged to be pierced by a piercing element includes an annular area of a bottom of the cartridge, and the filter guard is arranged to contact a piercing element and resist damage to the filter when the container surface is pierced in any part of the annular area.

21. A cartridge for use in forming a beverage, the cartridge comprising:
   a rim arranged around an opening;
   a lid attached to the rim and closing the opening;
   a sidewall extending from the rim;
   a beverage medium arranged to interact with liquid to form a beverage;
   a filter attached to the rim or sidewall and having a cup shape defining a space in which the beverage medium is located, the filter arranged so that liquid that interacts with the beverage medium must flow through the filter to pass out of the space; and
   a filter guard having a portion constructed and arranged to be interposed between a portion of the filter and a point of a piercing element of a beverage machine that is extended into the cartridge and remains in place in the cartridge to permit beverage to exit the cartridge, the filter guard being constructed and arranged to move and deform the cup shape of a portion of the filter relative to the rim and sidewall upon contact with the piercing element, and remain in contact with the piercing element and resist damage to the filter by the piercing element as liquid is introduced into the container under pressure during use in forming a beverage.

22. The cartridge of claim 21, wherein the filter guard is permanently attached to the filter.

23. A cartridge for use in forming a beverage, the cartridge comprising:
   a container defining an interior space having first and second portions, the container having a surface including an annular area at a bottom of the container arranged to be pierced by a piercing element to permit a beverage to exit the interior space, the annular area being positioned around a center of the bottom and excluding the center of the bottom;
   a beverage medium arranged to interact with liquid introduced into the container to form a beverage, the beverage medium being located in the first portion of the interior space;
   a filter at least partially located in the interior space, the filter having a bottom and being arranged so that liquid that interacts with the beverage medium in the first portion of the interior space flows through the filter toward the second portion of the interior space; and
   a filter guard disposed in the interior space and having a disc-shaped element between the bottom of the filter and the container bottom surface, the filter guard being constructed and arranged to contact a point of a piercing element that pierces the bottom of the container at any one of multiple locations within the annular area, extends into the interior space and remains in place to permit a beverage to exit the interior space, the disc-shaped element being arranged to tilt in the interior space with contact with a piercing element that enters the interior space so as to displace, deform and support the filter in a position to prevent contact between the filter and the piercing element as liquid is introduced into the container under pressure during use in forming a beverage, wherein the filter guard is arranged to provide a flow channel at a periphery of the filter guard between the filter guard and the container when moved with contact with the piercing element to allow beverage that flows through the filter to flow past the filter guard toward the bottom of the container via the flow channel during use in forming the beverage.

* * * * *